Jan. 7, 1969     H. L. DOBRIKIN     3,420,271
HAND CONTROL MODULATION VALVE
Filed Aug. 29, 1966
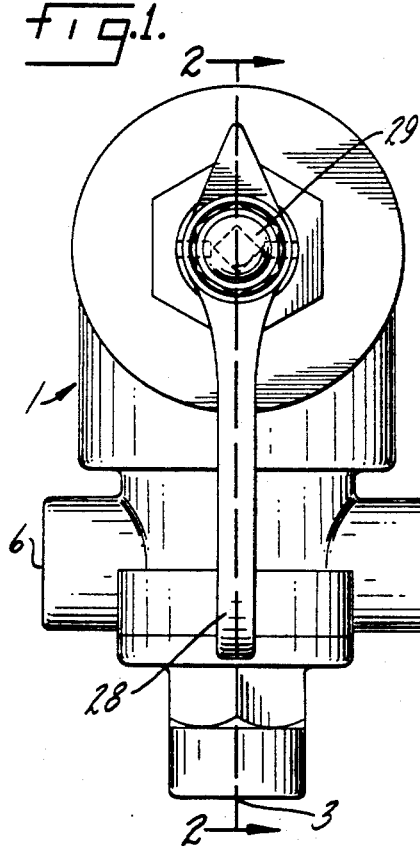
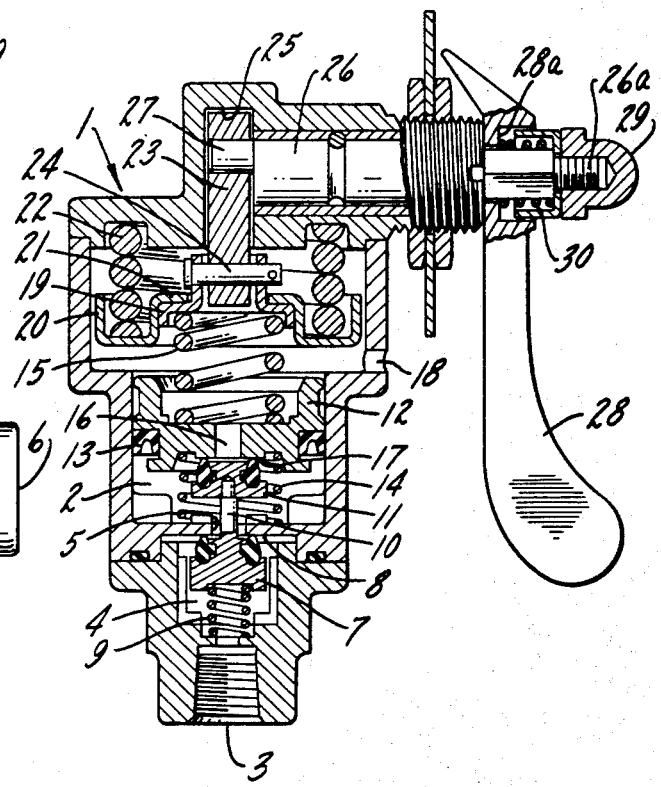
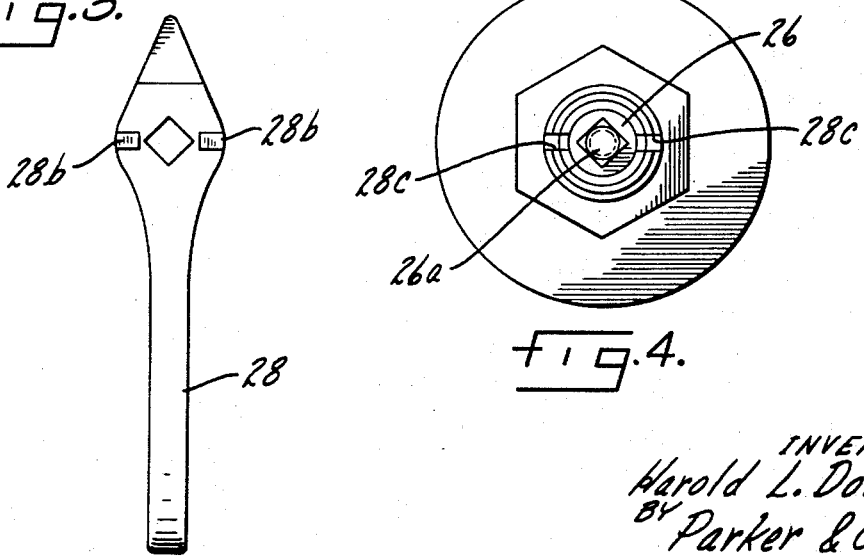
INVENTOR.
Harold L. Dobrikin,
BY Parker & Carter
Attorneys.

United States Patent Office 3,420,271
Patented Jan. 7, 1969

3,420,271
HAND CONTROL MODULATION VALVE
Harold L. Dobrikin, 2765 Summit Ave.,
Highland Park, Ill. 60035
Filed Aug. 29, 1966, Ser. No. 575,874
U.S. Cl. 137—627.5                        7 Claims
Int. Cl. F16k 17/168

This invention relates to control mechanisms for vehicle air brake systems and has particular relation to a hand control modulation valve for air brake systems of tractor-trailer vehicles and the like.

Emergency brake actuators are in use having a piston held inactive by air pressure and a spring positioned to move the piston and apply the vehicle brakes upon failure of said air pressure. It is one purpose of the invention to provide a hand-control means for operating said actuators to apply varying amounts of spring brake pressure and to release said brake-applying spring pressures.

Another purpose of the invention is to provide a means available to the vehicle operator for manual and modulated emergency brake application.

Another purpose is to provide manually operable valve means for modulated emergency brake application having position-retaining means.

Another purpose is to provide a hand control modulation valve for vehicle air brake systems having automatic brake-release means.

Another purpose is to provide a modulating brake control having eccentric control means.

Another purpose is to provide a hand control modulation valve of minimum parts and maximum simplicity and economy in manufacture.

Another purpose is to provide a brake application valve employing a yielding operating means and means for varying the force thereof.

Other purposes will appear from time to time during the course of the specification and claims.

The invention is illustrated more or less diagrammatically in the accompanying drawings, wherein:

FIGURE 1 is a front view of the valve of the invention;

FIGURE 2 is a view in cross-section of the valve of the invention taken on the line z—z of FIGURE 1;

FIGURE 3 is a detail view of a handle used with the invention; and

FIGURE 4 is a detail view of the matching element of FIGURE 3.

Like parts are indicated by like numerals throughout the specification and drawings.

Referring now to the drawings, the numeral 1 generally designates a housing. Defined within the housing 1 is a chamber 2. A fluid pressure supply inlet 3 is formed in housing 1 for communication through a subchamber 4 and valve passage 5 with the chamber 2. Bracket outlets 6 are formed in housing 1 as seen in FIGURE 1 for communicating the chamber 2 with the air chamber in a spring-applied, air-pressure-released emergency chamber (not shown).

Movable in subchamber 4 is a fluid pressure inlet controlling valve element 7 yieldingly urged toward its seat 8 by spring 9 to close passage 5. The valve 7 is fixed, as by shaft portion 10 extending through passage 5, to an exhaust valve upper portion of chamber 2 above outlets 6 and carries the seal 13 in engagement with the wall of chamber 2. A yielding means 14 engages an end wall of chamber 2 and the piston 12 to urge the latter in a direction away from exhaust valve 11 and outlets 6. A yielding operating member is shown as the spring 15 engaging the piston 12 on the opposite side thereof from spring 14 and being of substantially greater force than spring 14.

An exhaust passage 16 is formed in piston 12 in position to be closed when valve 11 is seated upon valve seat 17 formed on piston 12 about the passage 16. The passage 16 communicates chamber 2 with housing exhaust outlet 18 when valve 11 is off its seat 17.

An operating structure includes a cap member 19 engaging the opposite end of spring 15 from the end thereof in engagement with piston 12. A spring retainer 20 has a shoulder 21 engaging cap 19. A heavy spring 22 engages retainer 20 to urge the same in a direction toward piston 12. An operating link 23 is pivotally joined, adjacent one of its ends, to cap 19 by pin 24.

A major portion, as the parts are shown in the drawings, of link 23 extends into an upstanding, as the parts are shown, slot 25 formed in housing 1. A rotatable operating shaft 26 extends laterally of the axis of housing 1. The shaft 26 includes an eccentric finger portion 27 engaging the link 23. The shaft 26 extends outwardly of housing 1 for engagement by manually operable handle element 28. The external portion 26a of shaft 26 carries a cap element 29. A resistance spring 30 engages element 29 and the base of a pocket 28a formed in handle 28 to urge the handle 28 toward housing 1 and thus to urge locking fingers 28b into the slots 28c when fingers 28b are aligned with said slots 28c.

The use and operation of the invention are as follows:

It will be understood that a fluid pressure source is connected to inlet 3 for supply of fluid pressure to the valve of the invention. When the vehicle operator desires to release the emergency spring brakes, he merely grasps the handle 28, pulls it outwardly to disengage fingers 28b from slots 28c, and rotates it a relatively short distance. Thus the shaft 26 and eccentric finger 27 will be rotated to move link 23 downwardly as the parts are shown in the drawings. Through pin 24 in cap 19, the said downward movement of link 23 tends to compress spring 15. The said movement of handle 28 is facilitated by the action of power spring 22 against retainer 20 and cap 19. Through spring 15 the downward movement of link 23 is transmitted to piston 12, to seat valve 11 and to move valves 11 and 7 to unseat valve 7 from its seat 8 and thus to permit the fluid pressure supplied in inlet 3 to pass through chamber 2 and outlets 6 to the air chambers of the emergency spring brakes to move the pistons therein against the brake-applying springs and thus to release the spring brakes.

When emergency spring brake application is desired, the operator merely returns the handle to the piston shown in FIGURE 1. Thereupon spring 9 will return valve 7 to its closed position, precluding further communication of fluid pressure through inlet 3 with chamber 2. The pressure in the air chambers of the emergency spring brakes and the air pressure lines in communication with outlets 6 will, in cooperation with sprng 14, move piston 12 upwardly against the action of spring 15, a distance sufficient to separate the valve seat 17 from valve 11, thus opening chamber 2 through passage 16 for communication with housing exhaust outlet 18. The resulting loss of air pressure in the chambers permits the springs therein to apply the vehicle brakes. Following the exhaust of the pressure in the brake lines and in chamber 2, spring 15 is effective to return the piston 12 to engagement with exhaust valve 11, as shown in FIGURE 2. It will be understood that return of handle member 28 to the position shown in FIGURE 1 was effective, through shaft 26 and link 23, to withdraw spring retainer 20 and to render spring 22 inactive, thus limiting the resistance of piston 12 to movement away from valve 11 to the effect of spring 15.

Thus the operator may move handle 28 as desired to apply and release the vehicle brakes through control of the emergency brake actuators as and to the extent required by conditions of road surface, vehicle weight and speed and the like. Such minute variations in brake application are accomplished through the "feel" provided by preloaded spring 15. The handle may be locked in the brakes-on position by means of fingers 28b and slots 28c. Should the handle be inadvertently released by the operator at some point in its travel with fingers 28b out of engagement with slots 28c, the spring 22 is effective to move retainer 20 and cap 19 downwardly and thus to move piston 12 against exhaust valve 11 and to open inlet valve 7 to supply air pressure to outlets 6 and the emergency air chambers to release the brakes, the downward movement of cap 19 drawing link 23 downwardly and rotating handle 28 through finger portion 27 and shaft 26.

What is claimed is:

1. A control valve for spring-applied, fluid pressure-released brake actuators, said valve including a housing, a pressure inlet in said housing, a pressure outlet in said housing, a valve member controlling communication between said inlet and outlet, an exhaust valve element connected to said valve member, an operating piston reciprocal in said housing, an exhaust passage through said piston and said housing, said piston being movable in one direction against said exhaust valve element to close said exhaust passage and open said valve member, and means for moving said piston in said direction including a cap element, a spring between said cap and said piston, a link movable in said housing and pivotally connected to said cap, a handle eccentrically engaging said link and rotatably mounted on said housing and a power spring in said housing, said power spring engaging said cap and said housing to urge said cap toward said piston.

2. The structure of claim 1 characterized by and including locking means carried by said handle and engageable with said housing to lock said handle against the action of said power spring when said handle is in a position compressing said power spring and said piston is free to move off said exhaust valve element.

3. The structure of claim 1 characterized by and including a first yielding means urging said piston in a direction away from said exhaust element and a second yielding member urging said valve member toward a position closing communication between said inlet and outlet.

4. The structure of claim 2 characterized by and including a yielding member engaging said handle to urge said locking means into engagement.

5. A control valve for a spring-applied, air-released brake actuator chamber, said valve including a housing, an air pressure inlet in said housing, an air pressure outlet positioned for connection with said chamber, a valve member controlling communication between said inlet and outlet, manually operable means in said housing for opening said valve member, and a power spring engaging said means within said housing and urging said means toward valve member opening position.

6. The structure of claim 5 characterized by and including lock elements positioned on said housing to lock said power spring in its compressed, inoperable state.

7. The structure of claim 6 characterized by and including an exhaust outlet in said housing, an exhaust valve member controlling communication between said air pressure outlet and said exhaust outlet, said exhaust valve being operable when said power spring is in said state.

References Cited

UNITED STATES PATENTS

| | | | |
|---|---|---|---|
| 2,812,218 | 11/1957 | Fitch | 137—627.5 X |
| 2,854,289 | 9/1958 | Schnell | 137—627.5 X |
| 3,026,908 | 3/1962 | Blair | 137 627.5 |
| 3,340,898 | 9/1967 | Strauss | 137—627.5 |

CLARENCE R. GORDON, *Primary Examiner.*